United States Patent
Silverman et al.

(10) Patent No.: US 9,065,580 B2
(45) Date of Patent: *Jun. 23, 2015

(54) CLOCK SYNCHRONIZATION

(75) Inventors: Matthew Aaron Silverman, Richfield, OH (US); Paul Jeffrey Stager, Akron, OH (US); Brian Donald Hart, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 327 days.

This patent is subject to a terminal disclaimer.

(21) Appl. No.: 13/552,093

(22) Filed: Jul. 18, 2012

(65) Prior Publication Data

US 2012/0280714 A1 Nov. 8, 2012

Related U.S. Application Data

(63) Continuation of application No. 12/405,383, filed on Mar. 17, 2009, now Pat. No. 8,249,049.

(51) Int. Cl.
*H04J 3/06* (2006.01)
*H04W 56/00* (2009.01)

(52) U.S. Cl.
CPC ......... *H04J 3/0667* (2013.01); *H04W 56/0075* (2013.01)

(58) Field of Classification Search
CPC . H04W 56/0075; H04W 4/206; H04W 4/023; H04J 3/0667; G06F 3/017; G06F 3/038; G06F 3/04883; G06F 3/011; H04M 1/7253

USPC .......................... 370/328–516; 709/219–224
See application file for complete search history.

(56) References Cited

U.S. PATENT DOCUMENTS

| | | | | |
|---|---|---|---|---|
| 7,487,229 B2* | 2/2009 | Ohly | ............................. | 709/219 |
| 7,532,196 B2* | 5/2009 | Hinckley | ...................... | 345/156 |
| 7,636,794 B2* | 12/2009 | Ramos et al. | .................. | 709/248 |
| 7,978,680 B1* | 7/2011 | Vandwalle et al. | ............ | 370/350 |
| 8,249,049 B2* | 8/2012 | Silverman et al. | ............ | 370/350 |
| 2007/0124503 A1* | 5/2007 | Ramos et al. | .................. | 709/248 |
| 2012/0280714 A1* | 11/2012 | Silverman et al. | ............... | 326/93 |

\* cited by examiner

*Primary Examiner* — Nicholas Sloms
(74) *Attorney, Agent, or Firm* — Patterson & Sheridan, LLP (57) ABSTRACT

In an example embodiment, a method for synchronizing clocks between a plurality of clocked devices where one of the plurality of clocked devices is not directly synchronized with another of the plurality of clocked devices. Clock offset and a clock drift between a first clock associated with a first device and a second clock associated with a second is directly determined based on signals exchanged between the first and second devices. Clock offset and clock drift between the second clock and a third clock associated with a third device is directly determined based on signals exchanged between the second and third devices. A clock offset and clock drift between the first clock and third clock is determined based on a difference between the clock offset and drift between the first and second clocks and the clock offset and drift between the second and third clocks.

21 Claims, 8 Drawing Sheets

CLOCK SYNCHRONIZATION

CROSS REFERENCE TO RELATED APPLICATIONS

This application is a continuation of U.S. patent application Ser. No. 12/405,383 now U.S. Pat. No. 8,249,049, filed on Mar. 17, 2009.

TECHNICAL FIELD

The present disclosure relates generally to synchronizing clocks between a plurality of clocked devices.

BACKGROUND

Applications such as Time Difference of Arrival (TDOA) or Time of Arrival (TOA) methods for location determination rely on tight synchronization of the clocks of a plurality of devices such as access points. For example with TDOA for every nanosecond of uncertainty between access point (AP) clocks there is a foot of uncertainty in the spatial solution. AP clocks for example are naturally unsynchronized because of slight differences in the quartz crystals used to set clock frequencies. In addition, clock variations may occur due to temperature, age and clock jitter.

One solution for providing clock synchronization is distributing a clock via wires between the APs. This solution provides very precise and reliable synchronization, but adds difficulty and expense to deployment of the network and is inflexible regarding the repositioning of the APs over time.

Another solution is synchronizing APs through a wireless method, making deployment less expensive and more flexible regarding the repositioning of the APs over time. While wireless synchronization adds flexibility and reduces cost, it suffers from the unreliability of the wireless medium. For example, in some facilities, such as large manufacturing facilities, the line of sight between wireless devices may be interrupted, for example by the movement of a large overhead crane. In addition, multipath between wireless devices may also introduce error in synchronizing clocks.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a method for synchronizing clocks between a plurality of clocked devices where one of the plurality of clocked devices is not directly synchronized with another of the plurality of clocked devices. Clock offset and a clock drift between a first clock associated with a first device and a second clock associated with a second device is directly determined based on signals exchanged between the first and second devices. Clock offset and clock drift between the second clock and a third clock associated with a third device is directly determined based on signals exchanged between the second and third devices. A clock offset and clock drift between the first clock and third clock is determined based on a difference between the clock offset and drift between the first and second clocks and the clock offset and drift between the second and third clocks.

In accordance with an example embodiment, there is disclosed herein an apparatus, comprising an interface configured to receive data from a plurality of clocked devices, and logic configured to acquire data representative of clock synchronization data between a first clock associated with a first clocked device and a second clock associated with a second clocked device. The clock synchronization data comprises data representative of clock offset between the first and second clocks data and data representative of clock drift corresponding to the rate of change of clock offset between the first and second devices. The logic is operable to to synchronize the first clock and second clock at a future time based on the clock synchronization data.

In accordance with an example embodiment, there is disclosed herein an apparatus comprising a communication interface configured to communicate with a plurality of wireless access points, comprising a first wireless access point, a wireless second access point and a third wireless access point and logic in communication with the communication interface. The logic is configured to acquire data representative of clock synchronization data between a first clock associated with a first wireless access point and a second clock associated with a second wireless access point and data representative of clock synchronization data between the second clock and a third clock associated with a third wireless access point via the communication interface, The logic is configured to acquire data representative of a time a signal is received by the first access point time stamped by the first clock, the time the signal is received by the second access point time stamped by the second clock, and a time the signal is received by the third access point time stamped by the third clock via the communication interface. The logic is configured to directly synchronize the time the signal was received relative to the second clock with the time the signal was received relative to the third clock based on clock synchronization data between the second and third clocks. Furthermore, the logic is configured to indirectly synchronize the time the signal was received relative to the first clock with the time the signal was received relative to the third clock by determining a difference between the clock synchronization data between the first and second clocks and the clock synchronization data between the second and third clocks.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Figure 1:
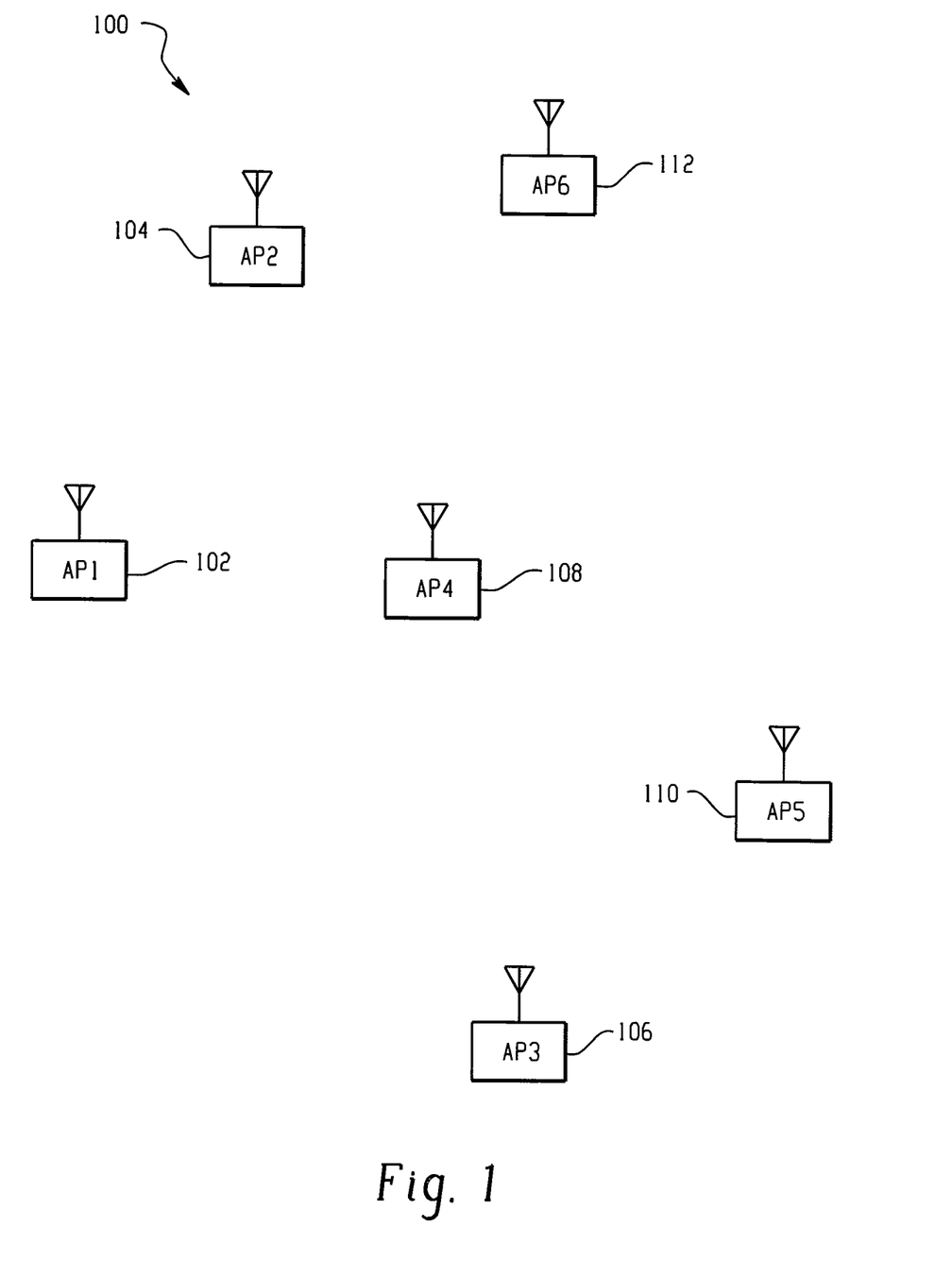
FIG. 1 is a block diagram illustrating an example of a wireless network.

FIG. 1 is a block diagram illustrating an example of a wireless network 100. For purposes of the example being described herein, six access points (APs) 102, 104, 106, 108, 110, 112 are illustrated although those skilled in the art should readily appreciate that the principles described herein are applicable to any network with any physically realizable number of clocked devices such as access points. APs 102, 104, 106, 108, 110, 112 are coupled to a device (not shown) configured to perform clock synchronization among APs 102, 104, 106, 108, 110, 112 via a network (not shown). The network coupling APs 102, 104, 106, 108, 110, 112 may be any suitable wired, wireless or combination of wired and wireless networking topologies.

Direct Synchronization

In general, if there exists N APs, where N is an integer and N>1, then among these N APs, there are $$\binom{N}{2} = \frac{N!}{2!(N-2)!}$$

AP pairs. Each of these APs has an internal clock that is running at its own frequency that is close to, but not at, the ideal frequency for the clock. Therefore, the N AP clocks are out of synchronization with one another.

In an example embodiment, each AP within a network and can communicate information to a device such as a synchronization/location server that can estimate clock offsets between AP pairs to virtually synchronize the AP clocks. The server takes the timestamps from all APs that are networked to it and determines the clock offsets between those APs, and in addition, the rate at which the clock offsets are changing (also referred to herein as "clock drift," which will be described herein infra). The server can virtually synchronize the APs 102, 104, 106, 108, 110, 112 at any future time by employing the determined offset and rate of change in offset values.

As used herein, virtual synchronization means that the actual clocks themselves will remain to operate at their own pace, but the server can use the offsets and rate of change of offsets to correct the clocks as may be relevant to the service. For example, in TDOA, if a tag packet were received at AP1 102 and AP2 104, the time of arrival of the packet at those APs would be used by the server to determine the time difference of arrival. However, first the server would subtract out the known clock offset between AP1 and AP2 to produce the correct TDOA value. In that regard, we say that AP1 and AP2 are virtually synched by the server. The actual way the virtual synch performed in the server depends on the purpose of the synchornization. In the case of TDOA, AP pairs must be synchronized to one another to produce the correct TDOA value. There may be cases where all APs must be synced at once.

To provide the server with the information needed to virtually synchronize the clocks, each of these AP pairs undergoes an exchange of packets. This exchange can take place at regular intervals. The interval can vary, making the exchange consistent with a CSMA (Carrier Sense Multiple Access) medium.

In each exchange, the packets are used by the server to estimate the difference between the clocks in that AP pair (for example between AP1 102 and AP2 104). One of the APs in the pair ("the first AP" e.g. AP1 102) will initiate the exchange by sending a packet to the other AP in the pair ("the second AP" e.g. AP2 104). The first AP will timestamp the transmission of the packet, and the second AP will timestamp the arrival of the packet, yielding $tx^1_m$ and $rx^2_m$, respectively, where m is the time of the packet exchange for an AP pair according to the AP in that pair that initiated the exchange (the first AP in this example). The second AP will reply with a packet and timestamp the transmission of the packet, $tx^2_m$. The first AP will receive the packet from the second AP and timestamp the arrival, $rx^1_m$.

Timestamps $[tx^1_m, rx^2_m, tx^2_m, rx^1_m]$ are communicated though the network to the synchronization/location server. The propagation delay between the first and second APs can be computed using equation 1:

$$(rx_m^2 + \Delta t_m^{1,2}) - tx_m^1 = t_{prop} = rx_m^1 - (tx_m^2 + \Delta t_m^{1,2}) \quad \text{(Equation 1)},$$

Rearranging equation 1 yields, $$\Delta t_m^{1,2} = \tfrac{1}{2}[(rx_m^1 - rx_m^2) + (tx_m^1 - tx_m^2)] \quad \text{(Equation 2)},$$

where $\Delta t_m^{1,2}$ is the clock offset of clock 2 relative to clock 1 (or in this example the clock of AP2 relative to the clock of AP1).

Alternatively, $$\Delta t_m^{1,2} = -\Delta t_m^{2,1} \quad \text{(Equation 3)}$$

Equation 2 is used to estimate the clock offset for any of the $$\binom{N}{2}$$

AP pairs that exchanges packets and provides $[tx^1_m, rx^2_m, tx^2_m, rx^1_m]$ to the server.

In an example embodiment, the synchronization/location server will, in addition to tracking $\Delta t$ for each AP pair, track the change in $\Delta t$ for each AP pair over time (i.e. $\Delta t'$ or $$\left(\text{i.e. } \Delta t' \text{ or } \frac{d\Delta t_m^{i,j}}{dt}\right).$$

A first order approximation of $\Delta t'$ is calculated for a given AP pair by the server after 2 or more $\Delta t$ estimates have been produced for that pair. The following equation captures the first order approximation of the rate of change of Δt for APi and APj with Δt estimations taken between the pair at times m and m−1.

$$\Delta t_m'^{i,j} \approx \frac{\Delta t_m^{i,j} - \Delta t_{m-1}^{i,j}}{T_m^{i,i} - T_{m-1}^{i,i}} \quad \text{(Equation 4)}$$

With known Δt and Δt' (in addition to the most recent time those were measured) for all $$\binom{N}{2}$$

AP pairs, a synch group can be formed consisting of any subset of the N APs at any time. To create a synchronized group, all AP pairs must have there Δt translated to a common timeframe (for example this common timeframe could be the time of arrival (TOA) of a tag packet according to one of the AP clocks or it could be any arbitrary event). This translation of Δt to another timeframe is done with the equation below.

$$\begin{bmatrix} \Delta t_m^{i,j} \\ \Delta t_m'^{i,j} \end{bmatrix} = \begin{bmatrix} 1 & T_m^i - T_{m-1}^i \\ 0 & 1 \end{bmatrix} \begin{bmatrix} \Delta t_{m-1}^{i,j} \\ \Delta t_{m-1}'^{i,j} \end{bmatrix} \quad \text{(Equation 5)}$$

$T_m^i$ is the clock value of APi at timeframe of APi at moment m. Moment m is the time of the event that triggers a synch group creation. Or alternatively, $T_m^i$ is the value of APj clock at time m plus the difference between APi and APj clocks at that time. $T_{m-1}^i$ is the time according to the clock of APi when the last Δt and Δt' were measured and estimated.

$$T_m^i = T_m^j + \Delta t_m^{i,j} \quad \text{(Equation 5a)}$$

In the example illustrated in FIG. 1, there are 6 APs 102, 104, 106, 108, 110, 112 in the system, which results in 15 AP pairs. If all of the AP pairs can exchange packets well enough to maintain synchronization, a synchronization group can be created from a subset of those 6 APs at any time by translating all of the clocks to the same timeframe. For example, assume that all of the clocks are to be synchronized at a particular moment in the timeframe of AP1 102. The following equations illustrate how several Δt and Δt' can be translated to a common timeframe.

$$\begin{bmatrix} \Delta t_m^{1,2} \\ \Delta t_m'^{1,2} \end{bmatrix} = \begin{bmatrix} 1 & T_m^1 - T_{m-1}^1 \\ 0 & 1 \end{bmatrix} \begin{bmatrix} \Delta t_{m-1}^{1,2} \\ \Delta t_{m-1}'^{1,2} \end{bmatrix}$$

$$\begin{bmatrix} \Delta t_m^{3,2} \\ \Delta t_m'^{3,2} \end{bmatrix} = \begin{bmatrix} 1 & T_m^3 - T_{m-1}^3 \\ 0 & 1 \end{bmatrix} \begin{bmatrix} \Delta t_{m-1}^{3,2} \\ \Delta t_{m-1}'^{3,2} \end{bmatrix}$$

$$\begin{bmatrix} \Delta t_m^{5,3} \\ \Delta t_m'^{5,3} \end{bmatrix} = \begin{bmatrix} 1 & T_m^5 - T_{m-1}^5 \\ 0 & 1 \end{bmatrix} \begin{bmatrix} \Delta t_{m-1}^{5,3} \\ \Delta t_{m-1}'^{5,3} \end{bmatrix}$$

Indirect Synchronization

In accordance with an example embodiment, there may be situations where directly estimating the clock offsets between one or more AP pairs amongst the $$\binom{N}{2}$$

pairs cannot be done reliably because those AP pairs are prevented from performing regular packet exchanges due to network traffic or poor wireless connections due to obstructions. If an AP pair fails to obtain provide regular and reliable packet exchange timestamps to the server, an indirect calculation of the clock offset can be obtained as long as the APs within that pair have reliable direct clock offset data with another common AP.

For example, if AP5 110 and AP6 112 cannot perform the packet exchange regularly and accurately, but the other $$\binom{N}{2} - 1$$

AP pairs have provided the server with regular timestamp information to obtain direct clock offset estimates, the clock offset estimate between AP5 110 and AP6 112 can be indirectly calculated at the server using any $\Delta t_{m1}^{5,j}$ and $\Delta t_{m2}^{6,j}$.

For example, if both AP5 110 and AP6 112 have regular and reliable direct clock offset estimations with AP3 106, then the offset estimation between AP5 110 and AP6 112 can be calculated using $\Delta t_{m1}^{5,3}$ and $\Delta t_{m2}^{6,3}$.

In order to use $\Delta t_{m1}^{5,3}$ and $\Delta t_{m2}^{6,3}$ to produce $\Delta t_{m3}^{5,6}$, the clock offsets are translated to a common timeframe. With the Δt and Δt' of an AP pair, the server can translate the Δt of that AP pair to a different timeframe with equation 6 below where translation occurs from timeframe m−1 to m.

$$\begin{bmatrix} \Delta t_m^{i,j} \\ \Delta t_m'^{i,j} \end{bmatrix} = \begin{bmatrix} 1 & T_m^i - T_{m-1}^i \\ 0 & 1 \end{bmatrix} \begin{bmatrix} \Delta t_{m-1}^{i,j} \\ \Delta t_{m-1}'^{i,j} \end{bmatrix} \quad \text{(Equation 6)}$$

Where $T^i_m$ is the value of the clock of APi at the timeframe that is being translated to, and $T^i_{m-1}$ is the value of the clock of APi at the timeframe being translated from.

Below is an example of how this translation would be applied to the example of indirectly synchronizing AP5 110 and AP6 112 by using direct synchronization data established with AP3 106 for each AP.

$$\begin{bmatrix} \Delta t_{m3}^{5,3} \\ \Delta t_{m3}'^{5,3} \end{bmatrix} = \begin{bmatrix} 1 & T_{m3}^5 - T_{m1}^5 \\ 0 & 1 \end{bmatrix} \begin{bmatrix} \Delta t_{m1}^{5,3} \\ \Delta t_{m1}'^{5,3} \end{bmatrix} \quad \text{(Equation 7)}$$

$$\begin{bmatrix} \Delta t_{m3}^{6,3} \\ \Delta t_{m3}'^{6,3} \end{bmatrix} = \begin{bmatrix} 1 & T_{m3}^6 - T_{m2}^6 \\ 0 & 1 \end{bmatrix} \begin{bmatrix} \Delta t_{m2}^{6,3} \\ \Delta t_{m2}'^{6,3} \end{bmatrix} \quad \text{(Equation 8)}$$

In this example, once $\Delta t_{m1}^{5,3}$ and $\Delta t_{m2}^{6,3}$ are translated to a common timeframe, m3, $\Delta t_{m3}^{5,6}$ can be determined by the following equation.

$$\Delta t_m^{i,k} = \Delta t_m^{i,j} - \Delta t_m^{k,j} \quad \text{(Equation 9)}$$

Thus, in the preceding example, $$\Delta t_{m3}^{5,6} = \Delta t_{m3}^{5,3} - \Delta t_{m3}^{6,3} \qquad \text{(Equation 10)}$$

To illustrate by way of example of how a system may be comprised of many directly and indirectly synchronized AP pairs, an example will now be presented where there are 6 APs 102, 104, 106, 108, 110, 112 which yields 15 AP pairs. For this example, of those 15 AP pairs, 11 pairs have no trouble exchanging packets so that the server can track the clock offsets directly. However, 4 AP pairs have difficulty exchanging packets and must rely on indirect synchronization.

For this example, those pairs are:

AP1 102 and AP6 112 (pair 1);

AP1 102 and AP5 110 (pair 2);

AP2 104 and AP5 110 (pair 3); and

AP3 106 and AP6 112 (pair 4).

As will now be illustrated, pairs 1-4 rely on indirect synchronization from common AP parings. The following table shows what APs could be used as a common AP to create indirect synchronization for each of pairs 1-4. In this example, if an AP is shown not to be usable, it is because it has a poor connection with one or both of the APs in that pair or it is one of the APs in that pair.

| AP Pair | Possible Common AP For Indirect Synchronization (x) | | | | | |
|---|---|---|---|---|---|---|
| | AP1 | AP2 | AP3 | AP4 | AP5 | AP6 |
| AP1-AP6 | | x | | x | | |
| AP1-AP5 | | | x | x | | |
| AP2-AP5 | | | x | x | | x |
| AP3-AP6 | | x | | x | X | |

To determine the best common AP for each indirectly synched pair, the following metrics for the direct links to the common AP may be employed:

1. Received Signal Strength Indicator (RSSI)
2. The number of retries in the attempts at a direct synch between the common node and the pair.

In an example embodiment, the common AP with better RSSI and less retries to the pair is selected. The following table illustrates an example of how the best common AP for each pair could play out.

| AP Pair | Best Common AP To Do Indirect Synchronization (x) | | | | | |
|---|---|---|---|---|---|---|
| | AP1 | AP2 | AP3 | AP4 | AP5 | AP6 |
| AP1-AP6 | | x | | | | |
| AP1-AP5 | | | | x | | |
| AP2-AP5 | | | | | | x |
| AP3-AP6 | | | | | x | |

The best common AP can change any time a synchronized group needs to be created. In fact, whether or not an AP pair is directly or indirectly synchronized can be decided at the moment a synchronization group is formed (for example in the event of a tag packet being received in TDOA location). Furthermore, which APs that are to be included in a synchronized group can be decided at the very moment the group is formed, instead of predetermined synchronized groups.

Once the common APs are determined for each indirectly synched pair, the translation and indirect sync can occur.

Syncing AP1-AP6

$$\begin{bmatrix} \Delta t_{msync16}^{1,2} \\ \Delta t'^{1,2}_{msync16} \end{bmatrix} = \begin{bmatrix} 1 & T^1_{msync16} - T^1_{m\_12} \\ 0 & 1 \end{bmatrix} \begin{bmatrix} \Delta t_{m\_12}^{1,2} \\ \Delta t'^{1,2}_{m\_12} \end{bmatrix}$$

$$\begin{bmatrix} \Delta t_{msync16}^{6,2} \\ \Delta t'^{6,2}_{msync16} \end{bmatrix} = \begin{bmatrix} 1 & T^6_{msync16} - T^6_{m\_62} \\ 0 & 1 \end{bmatrix} \begin{bmatrix} \Delta t_{m\_62}^{6,2} \\ \Delta t'^{6,2}_{m\_62} \end{bmatrix}$$

$$\Delta t_{msync16}^{1,6} = \Delta t_{msync16}^{1,2} - \Delta t_{msync16}^{6,2}$$

Where $T_{msync16}^6$ is the time according to clock AP6 112 at the moment in time when it is desired to synchronize the clock AP1 102 and clock AP6 112. $T_{m\_62}^6$ is the time according to clock AP6 112 at the moment the last $$\begin{bmatrix} \Delta t_m^{6,2} \\ \Delta t'^{6,2}_m \end{bmatrix}$$

was determined—the moment is labeled m_62. Note that this convention is applied to the descriptions below and above.

Syncing AP1-AP5

$$\begin{bmatrix} \Delta t_{msync15}^{1,4} \\ \Delta t'^{1,4}_{msync15} \end{bmatrix} = \begin{bmatrix} 1 & T^1_{msync15} - T^1_{m\_14} \\ 0 & 1 \end{bmatrix} \begin{bmatrix} \Delta t_{m\_14}^{1,4} \\ \Delta t'^{1,4}_{m\_14} \end{bmatrix}$$

$$\begin{bmatrix} \Delta t_{msync15}^{5,4} \\ \Delta t'^{5,4}_{msync15} \end{bmatrix} = \begin{bmatrix} 1 & T^5_{msync15} - T^5_{m\_54} \\ 0 & 1 \end{bmatrix} \begin{bmatrix} \Delta t_{m\_54}^{5,4} \\ \Delta t'^{5,4}_{m\_54} \end{bmatrix}$$

$$\Delta t_{msync15}^{1,5} = \Delta t_{msync15}^{1,4} - \Delta t_{msync15}^{5,4}$$

The same algorithms can be employed for the remaining indirect AP pairs (AP3-AP5 and AP2-AP6).

Example of Robustness in a Changing Environment

Figure 2:
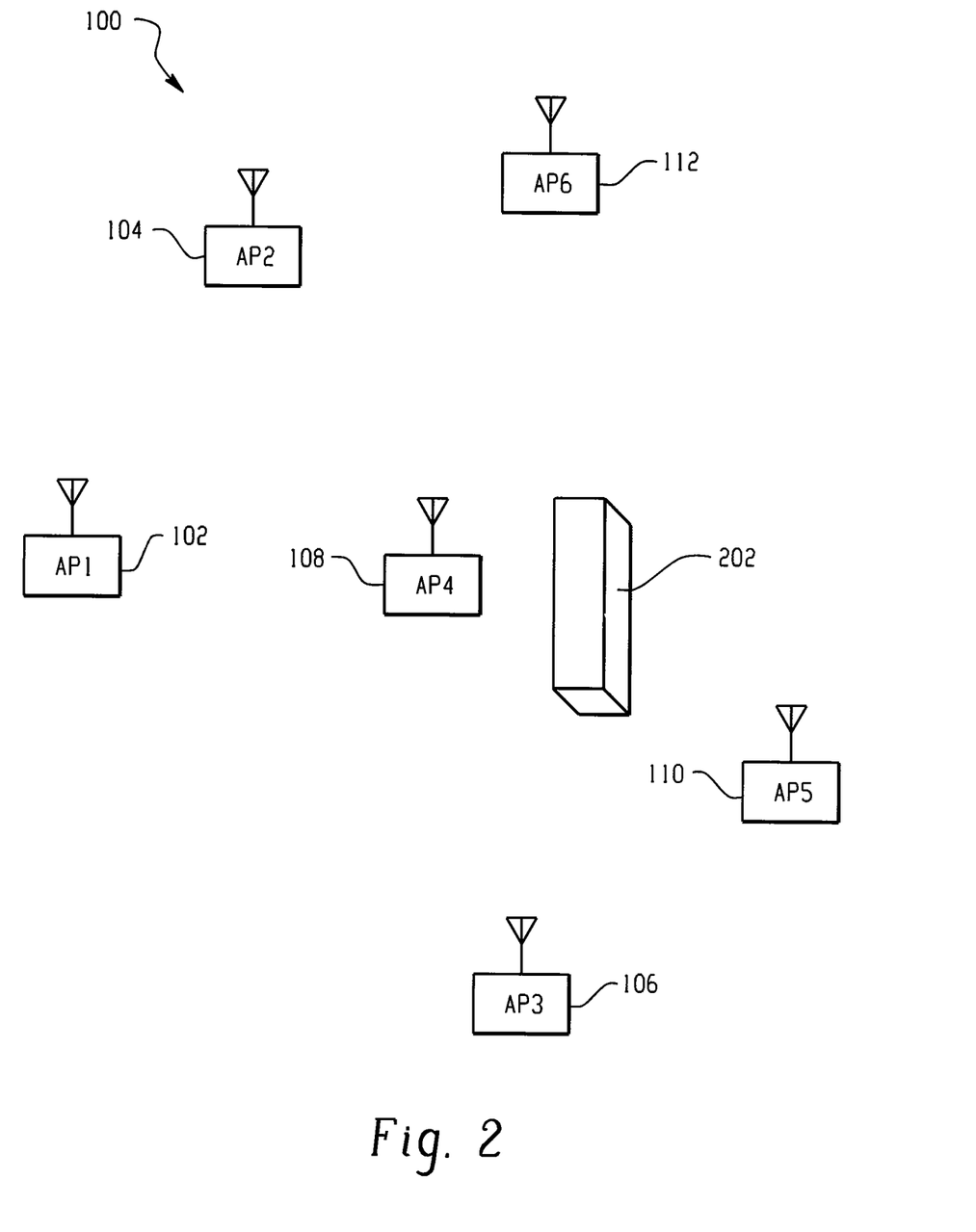
FIG. 2 illustrates an example of the network in FIG. 1 where an obstruction blocks the line of site between a plurality of access points.

FIG. 2 illustrates an example of network 100 in FIG. 1 where an obstruction 202 blocks the line of site between a plurality of access points. In this example, an obstruction suddenly appears between AP4 108 and AP5 110. Because of obstruction 202, AP4 108 and AP5 110 can no longer exchange packets. The next time that AP4 108 and AP5 110 are synchronized, they would be indirectly synchronized as described herein supra using a common AP (for example AP3 106 or AP6 112 would probably be a good choice for this example). This example illustrates that the entire system doesn't collapse just because a large change in the environment occurs—which is common in certain manufacturing facilities.

In addition to an example embodiment described herein being robust in the face of large obstructions coming in between APs, as will now be illustrated the example embodiment is also robust to a very common issue which is changes in the channel. For example, a channel has a coherence time that is on the order of milliseconds. As the channel changes, the time of arrival estimate can vary wildly, especially without a strong line of sight component to the received packet. In an example embodiment illustrated herein, the exchange of packets occurs so quickly (<1 ms), that the channel has not changed enough to effect the time of arrival estimation. Because the channel will be reciprocal (it is the same at both APs involved in the exchange) under most conditions, the time of arrival estimation will be very similar at both APs, removing a great deal of noise from the actual measurement itself.

Figure 3:
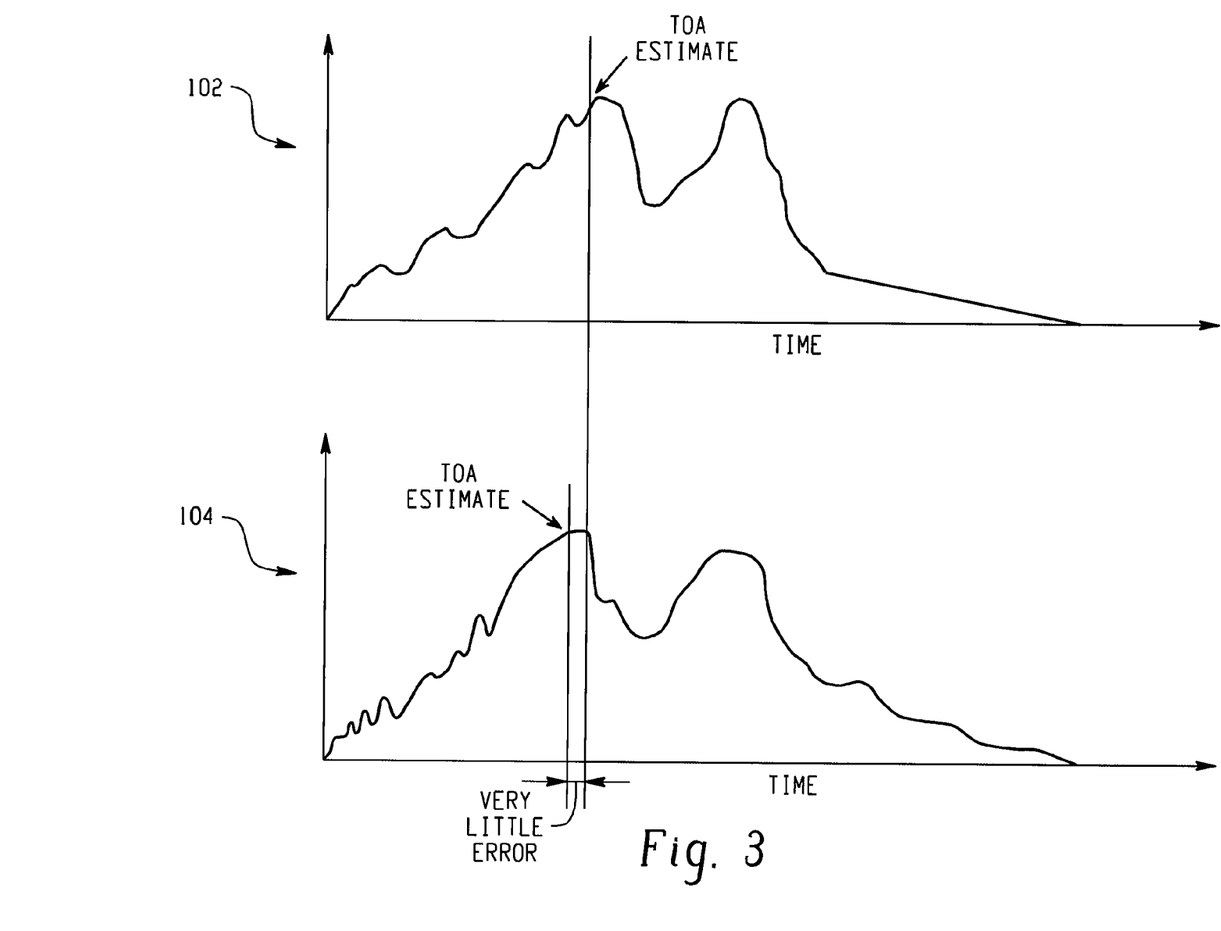
FIG. 3 illustrates an example signal diagram of packets exchanged between an AP pair with a small time delay.
Figure 4:
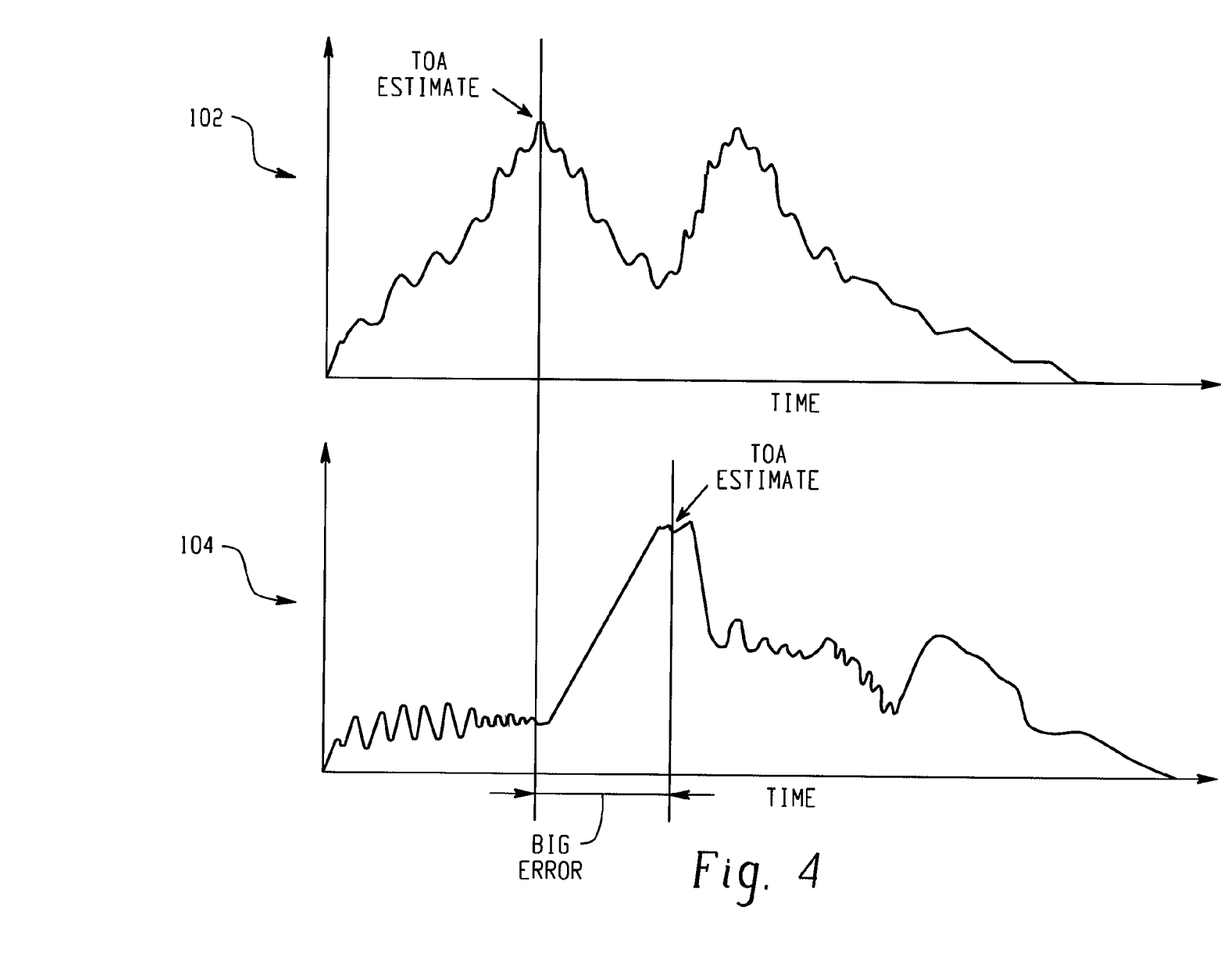
FIG. 4 illustrates an example signal diagram of packets exchanged between an AP pair with a larger time delay than the packet exchange illustrated in FIG. 3.

FIG. 3 illustrates received packet power during a packet exchange between AP1 102 and AP2 204. Since, in this example, very little time has passed between the receptions at each AP, (e.g. <1 ms) the channel is nearly identical. Therefore, a time of arrival estimation algorithm estimates the TOA at roughly the same point during the reception, leading to very little error in the estimation. In FIG. 4, however, enough time (e.g. >1 ms) has passed between AP1 102 receiving the packet from AP2 104, and AP2 104 receiving the packet from AP1 102 that the channel has changed. Therefore, a significant error, which can be on the order of nanoseconds, has been introduced. This illustrates an advantage of the example embodiments described herein over other embodiments that don't have an immediate call and response between synchronized APs. Thus, in an example embodiment, direct synchronization is limited to APs with packet exchanges within a predefined time period, such as 1 ms. Packet exchanges that are outside of the predefined time period (e.g. >1 ms) may be discarded.

Line of Sight

Referring again to FIG. 1 there is a direct line of sight (LOS) between AP4 108 and AP5 110. So tag packets are received in the amount of time it takes for the packet to travel the distance between the APs. For example, this time of flight can be on the order of 10 s or nanoseconds. In wireless systems that rely on knowing the time of flight down to the nanosecond by having a known separation between the APs, if an obstruction comes between the APs, for example obstruction 202 between AP4 108 and AP 110 as illustrated in FIG. 2, the packet will have a longer time of flight than expected and cause synchronization errors, which can range on the order of nanoseconds to tens of nanoseconds, resulting in poor clock synchronization.

In accordance with an example embodiment, the time of flight denoted below $T^{prop}$, has very little impact estimating of the clock offsets. Thus, LOS is not required for a good direct clock synchronization to occur.

For example, If the initial transmit from APi occurs at absolute time=0, $tx_m^i = AP_m^i$ (Equation 6), then the time the signal is received by APj is:

$$rx_m^j = AP_m^j + \frac{f_m^j}{f_{ideal}} \times T_m^{prop}. \quad \text{(Equation 7)}$$

It follows that the transmit of the response from APj is:

$$tx_m^j = AP_m^j + \frac{f_m^j}{f_{ideal}} \times (T_m^{prop} + T_{response}), \quad \text{(Equation 8)}$$

and the response is received by APi at:

$$rx_m^i = AP_m^i + \frac{f_m^i}{f_{ideal}} \times (2T_m^{prop} + T_{response}) \quad \text{(Equation 9)}$$

Where $f_m^n$ is the frequency of the clock of APn, $f_{ideal}$ is the specified frequency of both clocks, and $T_m^{prop}$ and $T_{response}$ are the propagation time between APs and the time for the second AP to receive the initial transmission and respond. Substituting into equation 1, $$\Delta t_m^{i,j} = \frac{2AP_m^i - 2AP_m^j + \frac{(f_m^i - f_m^j)}{f_{ideal}} \times (2T_m^{prop} + T_{response})}{2} \quad \text{(Equation 10)}$$

Therefore, the propagation time and response time are multiplied by the difference in the AP clock frequencies—which for example can be on the order or 20 ppm (parts per million). $T^{prop}$ is on the order of 10 s of nanoseconds. $T_{response}$ is on the order of hundreds of microseconds; however $T_{response}$ basically a static term that can be filtered out during calibration to bring its effect on the offset estimation down to picoseconds. Thus, the effect of $T^{prop}$ on the clock offset estimation is:

$$ErrorTiming \approx \frac{20}{1e6} \times (100e - 9) = 2e - 12$$

So, for a typical $T^{prop}$, the error is in picoseconds, which is well within the desired precision of an example embodiment. So $T^{prop}$ effectively has no effect on the estimation. As a result, the propagation time added by non line of sight (NLOS) can be ignored, and Equation 10 can be approximated as:

$$\Delta t_m^{i,j} = \frac{2AP_m^i - 2AP_m^j}{2} = AP_m^i - AP_m^j \quad \text{(Equation 11)}$$

Forming Dynamic Sync Groups/Domains

Figure 5:
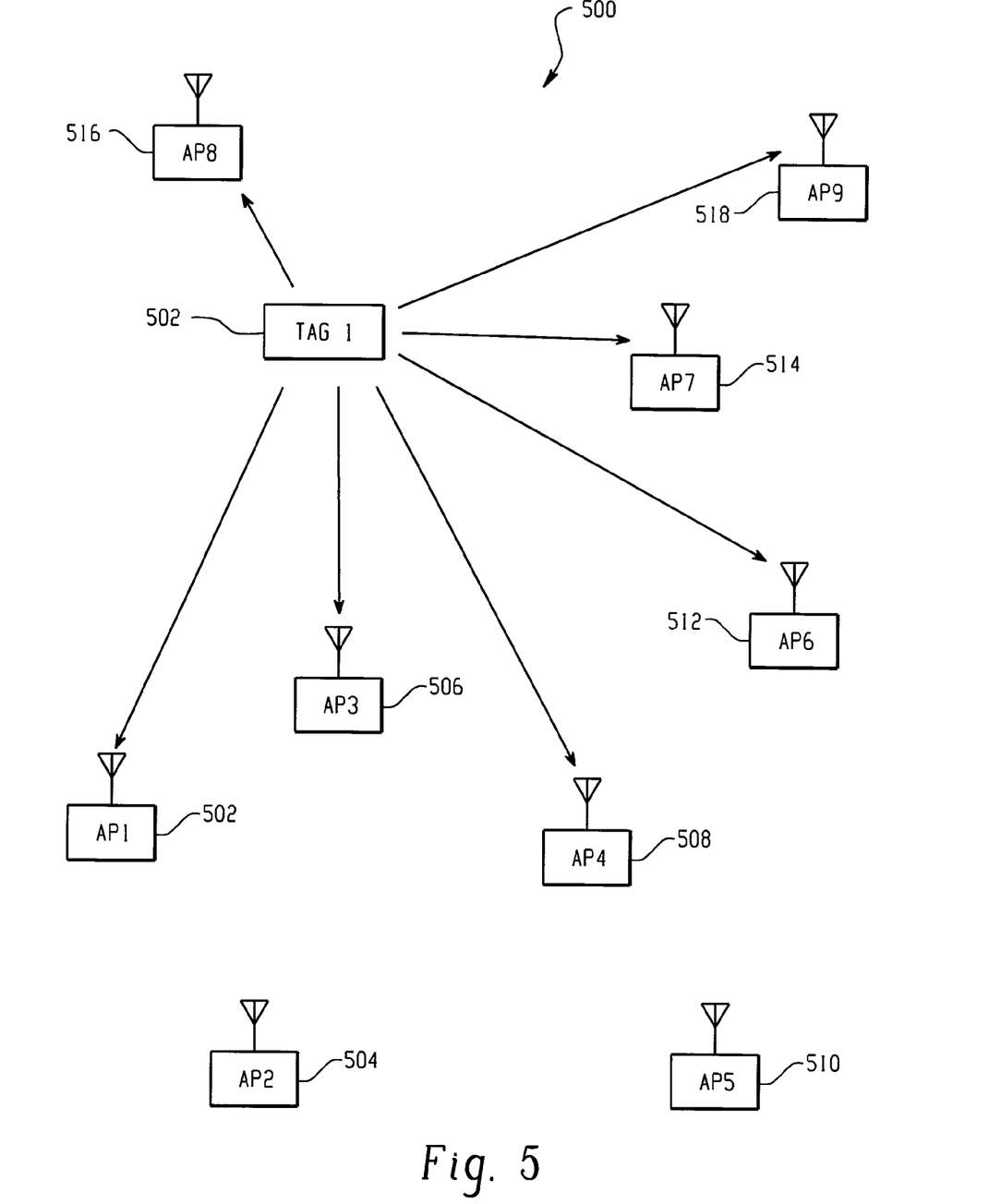
FIG. 5 illustrates an example of a network with a wireless device at a first location.
Figure 6:
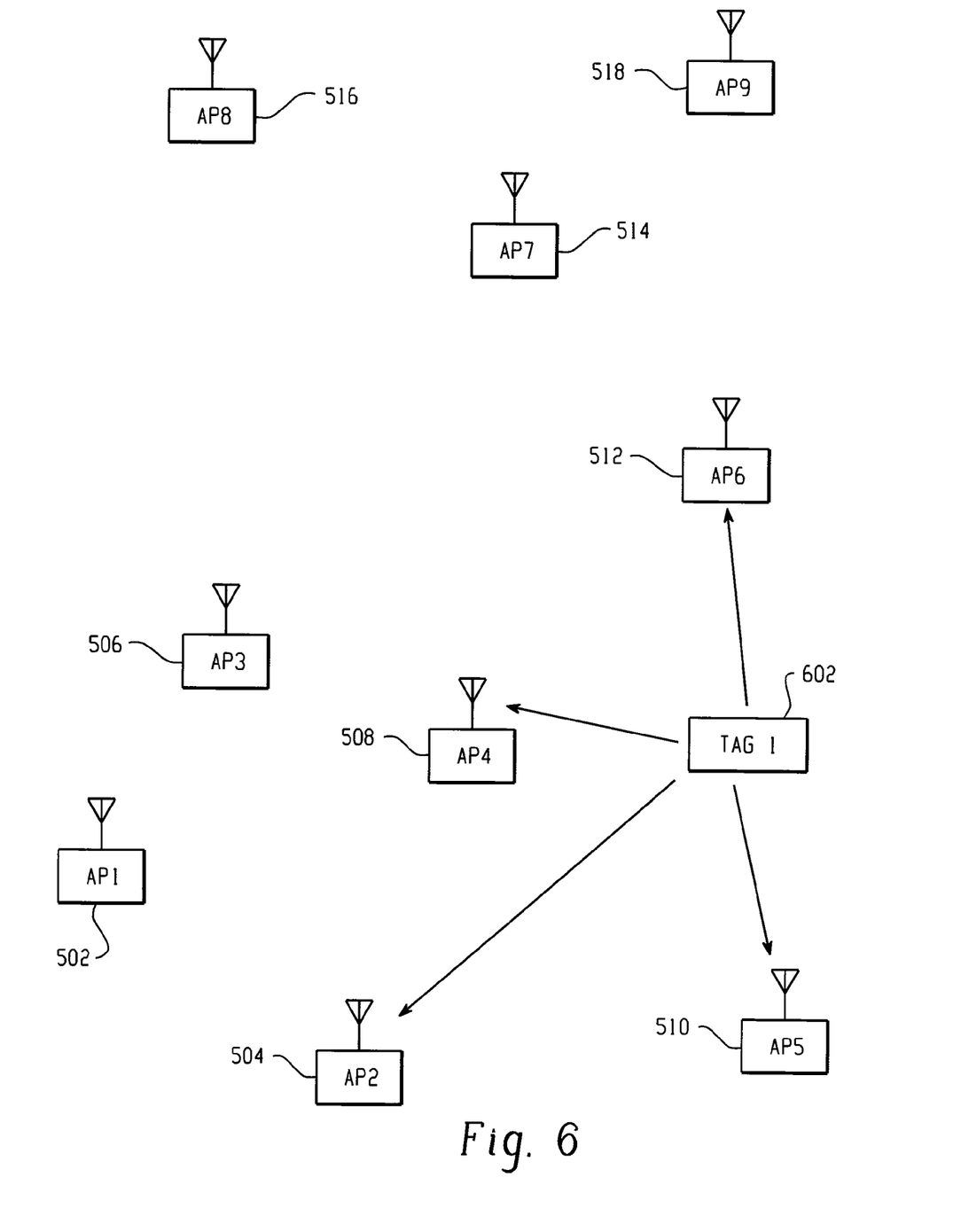
FIG. 6 illustrates an example of the network of FIG. 5 where the wireless device has moved to a second location.

FIG. 5 illustrates an example of a network 500 with several APs (AP1 502, AP2 504, AP3 506, AP4 508, AP5 510, AP6 512, AP7 514, AP8 516, AP9 518) and a wireless device (tag1) at a first location 502. At location 502, tag1 is received by certain (a first group of) APs in its vicinity, e.g., AP1 502, AP3 506, AP4 508, AP6 512, AP7 514, AP8 516 and AP9 518. As tag1 moves to location 602 in FIG. 6, the group of APs that can receive signals from tag1 changes. For example, n FIG. 6, tag1 has moved to location 602 and wireless signals sent from tag1 are received by a different (second) group of APs, e.g. AP3 506, AP4 508, AP5 510 and AP6 512. In accordance with an example embodiment, each synchronization group of APs can be created at the moment a signal from a tag packet is received by a member (or members) of the group. The group will consist of any AP that receives the tag packet that can be directly or indirectly synchronized to the other APs in the group. In an example embodiment, APs may belong to multiple groups. For example, in the preceding example, AP4 508 and AP6 512 belonged to both the first group when tag1 was at location 502 (FIG. 5) and the second group when tag1 was at location 602 (FIG. 6).

Figure 7:
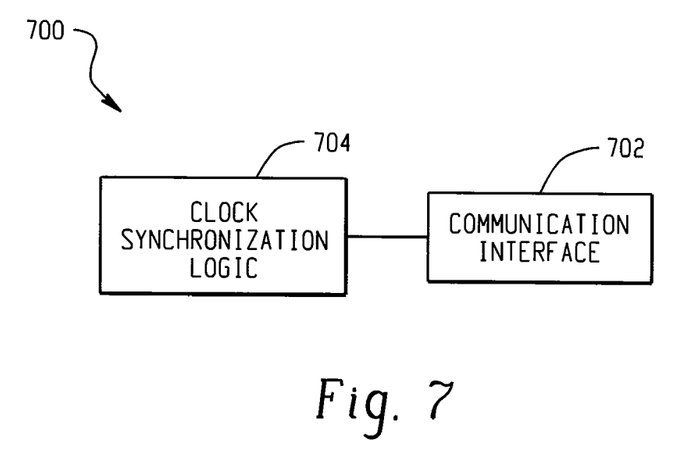
FIG. 7 illustrates an example of an apparatus for performing clock synchronization.

Referring to FIG. 7, there is illustrated a block diagram of an apparatus 700 for performing clock synchronization. Apparatus 700 comprises a communication interface 702 which is configured to receive data from the devices. Clock synchronization logic 704 is configured to receive the data from communication interface 702 and is operable to perform clock synchronization in accordance with various example embodiments that are described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

For example, apparatus 700 is suitably adapted to perform the clock synchronization functionality described herein with reference to FIGS. 1-2 and 5-6. In example embodiments, apparatus 700 may employ any of equations 1-11 described herein to perform clock synchronization. Apparatus 700 may perform direct synchronization between devices and indirect synchronization between devices as described herein. Although the example embodiments illustrated in FIGS. 1-2 and 5-6 refer to access points, those skilled in the art should readily appreciate that apparatus 700 can be configured to employ any one or more of equations 1-11 described herein to perform clock synchronization between any two devices that can directly synchronize with a common clock source.

For example, in FIGS. 1 and 2, apparatus 700 can be coupled to APs 102, 104, 106, 108, 110, 112 via a network (not shown), which may suitably comprise wired, wireless or a combination of wired and wireless segments, or any other suitable means. Communication interface 702 is operable to receive data from APs 102, 104, 106, 108, 110, 112 via a network and logic 704 is operable to implement the techniques described in the example embodiments to perform clock synchronization. As another example, apparatus 700 can be coupled to APs 102, 104, 106, 108, 110, 112 via a network (not shown), which may suitably comprise wired, wireless or a combination of wired and wireless segments. Communication interface 702 is operable to receive data from APs 102, 104, 106, 108, 110, 112 via a network and logic 704 is operable to implement the techniques described in the example embodiments to perform clock synchronization. As another example, in FIGS. 5 and 6, apparatus 700 can be coupled to AP1 502, AP2 504, AP3 506, AP4 508, AP5 510, AP6 512, AP7 514, AP8 516, AP9 518, where communication interface 702 is operable to receive data from AP1 502, AP2 504, AP3 506, AP4 508, AP5 510, AP6 512, AP7 514, AP8 516, AP9 518 and logic 704 is operable to synchronize clocks between APs as needed.

In an example embodiment, apparatus 700 is a standalone device such as a server. In particular embodiments, apparatus 700 may be co-located with another infrastructure node such as an AP, a switch, AAA (Authorization, Authentication and Accounting) server, WDS (Wireless Domain Server), or any other device capable of receiving data from the appropriate devices to perform clock synchronization.

Figure 8:
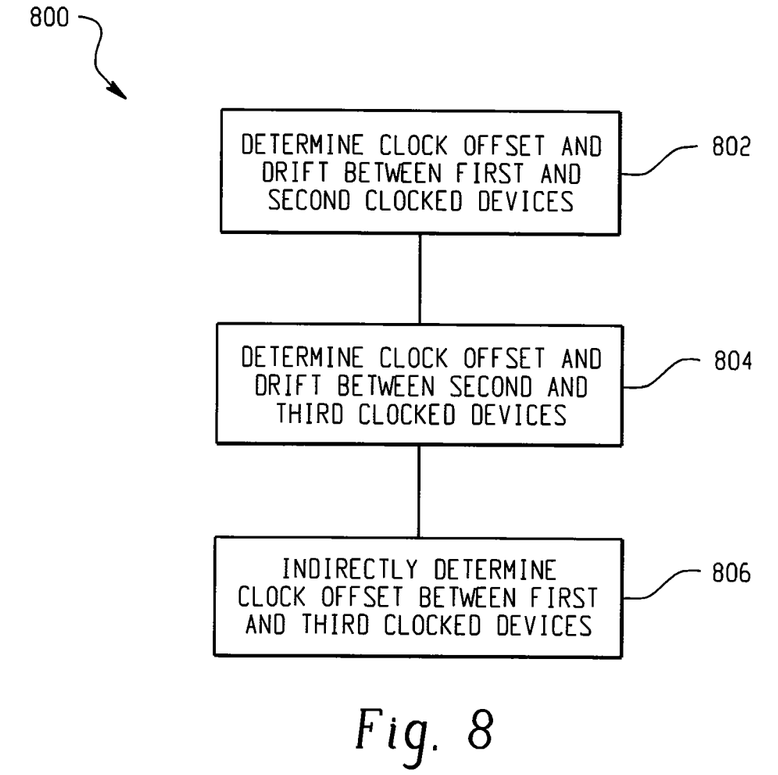
FIG. 8 illustrates an example of a method for synchronizing clocks for a plurality of devices.
Figure 9:
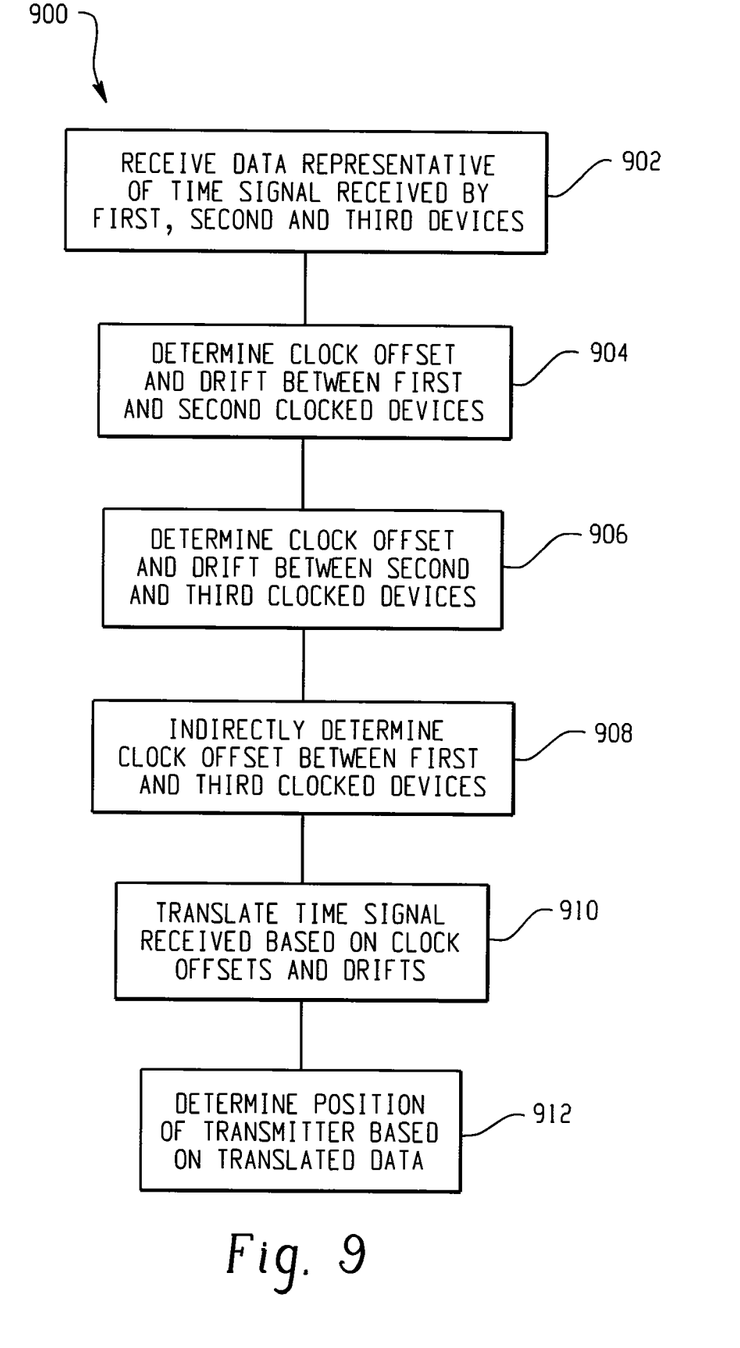
FIG. 9 illustrates an example of a method for determining a location of a device using time difference of arrival measurements where the timestamps of the receivers have been synchronized.

In view of the foregoing structural and functional features described above, methodologies in accordance with example embodiments will be better appreciated with reference to FIGS. 8 and 9. While, for purposes of simplicity of explanation, the methodologies of FIGS. 8 and 9 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement any of the methodologies described herein in accordance with an aspect the example embodiment. The methodologies described herein are suitably adapted to be implemented in hardware, software, or a combination thereof. As one skilled in the art should readily appreciate, the methodologies described in FIGS. 8 and 9 can be implemented by any node on a network such as a server, an access point, etc.

FIG. 8 illustrates an example of a method 800 for synchronizing clocks for a plurality of devices. Methodology 800 provides for the synchronizing of clocks for a plurality of devices in which at least two of the devices are not in direct communication with each other or cannot directly synchronize with each other. In the example being described herein, a first device with a first clock and a third device having a third clock can directly synchronize with a second device having a second clock (a common clock source), however, the first and third device cannot directly synchronize with each other.

At 802, a clock offset and clock drift between the first and the second clocked devices are determined (or acquired). For example, the first and second devices may exchange signals as described herein, and Equations 2 and 3 can be employed to derive the clock offset and clock drift for the two devices. In another example embodiment, clock offset and drift data may be provided.

At 804, a clock offset and clock drift between a second and a third clocked devices are determined (or acquired). For example, the second and third devices may exchange signals as described herein, and Equations 2 and 3 can be employed to derive the clock offset and clock drift for the two devices. In another example embodiment, clock offset and drift data may be provided.

At 806, the clock offset and drift are indirectly computed for the first device and the third device. This allows the clock of the first or third device to be translated to the domain of the other clock, e.g. the first clock can be translated to the third clock's domain or the third clock can be translated to the first clock's domain. In an example embodiment, the clock offset and drift can be calculated as the difference between the clock offset and drift of the first and second clocks, and the clock offset and drifts between the second and third clocks.

FIG. 9 illustrates an example of a method 900 for determining a location for a device using time difference of arrival measurements where the timestamps of the receivers have been synchronized. This example describes an embodiment where a signal is from a device is received by three receivers (such as access points), where the first and second, and second and third receivers can directly synchronize their clocks but the first and third receivers cannot synchronize their clocks.

At 902, data representative of the time a signal was received by the first receiver, second receiver and third receiver is received. The time the signal is received is relative to the clock of the receiver that received it. That is the time the signal was received by the first receiver is relative to the first receiver's clock, the time the signal was received by the second receiver is relative to the second receiver's clock, and the time the signal was received by the third receiver is relative to the third receiver's clock, At 904, clock offset and clock drift between the first and second clocked devices is determined (or acquired). For example, the first and second devices may exchange signals as described herein. Data acquired from the signal exchange may be provided and Equations 2 and 3 can be employed to derive the clock offset and clock drift for the two devices. In another example embodiment, clock offset and drift data may be provided.

At 906, a clock offset and clock drift between a second and a third clocked devices are determined (or acquired). For example, the second and third devices may exchange signals as described herein, and Equations 2 and 3 can be employed to derive the clock offset and clock drift for the two devices. In another example embodiment, clock offset and drift data may be provided.

At 908, the clock offset and drift are indirectly computed for the first device and the third device. This allows the clock of the first or third device to be translated to the domain of the other clock, e.g. the first clock can be translated to the third clock's domain or the third clock can be translated to the first clock's domain. In an example embodiment, the clock offset and drift can be calculated as the difference between the clock offset and drift of the first and second clocks, and the clock offset and drifts between the second and third clocks.

At 910, the timestamps for when the signals were received by the first, second and third receivers can be translated into the same time domain. For example, the timestamp for the first receiver can be translated to the third receiver's clock using an indirect synchronization technique described herein and the timestamp from the second receiver can be translated to the third receiver's clock directly. Alternatively, the timestamp for the third receiver can be translated to the first receiver's clock using an indirect synchronization technique described herein and the timestamp from the second receiver can be translated to the first receiver's clock directly.

At 912, the position of the device sending the signal is determined. The position is determined using receiver times translated to a common clock domain using direct and indirect synchronization as described herein. Any suitable TDOA algorithm may be employed to determine the position of the device.

Although the description herein references three devices, the example embodiments described herein should not be construed as being so limited as those skilled in the art should readily appreciate that any physically realizable number of devices may be employed. For example, in a four device embodiment, the first device can directly synchronize with the second device. The second device can also directly synchronize with a third device. The third device can also directly synchronize with a fourth device. Thus, the first device and fourth device can indirectly synchronize using the techniques described in the example embodiments herein. For example the fourth device can be translated to the second clock's domain and then translated to the first clock's domain or visa versa. Similarly, the first and third, second and fourth devices can also indirectly synchronize using techniques described in the example embodiments herein.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a communication interface operable to receive data from a plurality of clocked devices; and
logic in communication with the communication interface and operable to receive the data from the plurality of clocked devices;
wherein the data from the plurality of clocked devices comprises data representative of signal strengths measured by the plurality of clocked devices;
the logic is operable to determine multiple common clocked devices that are common to two clocked devices selected from the plurality of clocked devices; and
the logic is operable to select a selected common clocked device from the multiple common clocked devices for indirectly synchronizing the two clocked devices based on which of the multiple common clocked devices has higher measured signal strengths with the two clocked devices.

2. The apparatus set forth in claim 1, wherein data from the plurality of clocked devices further comprises data representative of retries between the multiple common clocked devices and the two clocked devices; and
the logic is further operable to select the selected common clocked device based on which of the multiple common clocked devices has higher measured signal strengths and lower number of retries with the two clocked devices.

3. The apparatus set forth in claim 2, wherein the data from the plurality of clocked devices further comprises clock synchronization data between a first clock associated with a first clocked device and a second clock associated with the selected common clocked device and via the communication interface;
wherein the clock synchronization data comprises data representative of clock offset and data representative of clock drift corresponding to a rate of change of the clock offset between the first and second clocks;
the logic is operable to synchronize the first clock and the second clock at a future time based on the clock synchronization data;
the logic further receives clock synchronization data for a third clock associated with a third clocking device and the second clock via the communication interface;
the logic is operable to indirectly synchronize the first clock and the third clock at the future time by translating the clock synchronization data between the first and second clocks and the clock synchronization data between the second and third clocks to a common time frame and determining a difference between translated data;
wherein the clock synchronization data between the first clock and second clock comprises data representative of a time a first signal was transmitted by the first clocked device based on the first clock and data representative of a time the first signal was received by the selected common clocked device clocked device based on the second clock;
wherein the clock synchronization data between the first clock and second clock further comprises data representative of a time a second signal was transmitted by the selected common clocked device clocked device based on the second clock and data representative of a time the second signal was received by the first clocked device based on the first clock; and
wherein the logic is operable to determine a clock offset based on a difference between the time the second signal was received by the first clocked device and the time the first signal was received by the selected common clocked device clocked device and a difference between the time the first signal was sent by first device and the time the second signal was sent by the selected common clocked device.

4. The apparatus set forth in claim 1, wherein the clock synchronization data between the second clock and third clock comprises a clock offset and a clock drift corresponding to a rate of change for the clock offset between the second and third clocks.

5. The apparatus set forth in claim 1, wherein the logic uses a first order approximation to compute the rate of change for the clock offset between the first and second clocks and the rate of change for the clock offset between the first and second clocks.

6. The apparatus set forth in claim 1, wherein the logic is operable to acquire data representative of clock synchronization data between a first clock associated with a first wireless access point and a second clock associated with a second wireless access point, the selected common clocked device, and data representative of clock synchronization data between the second clock and a third clock associated with a third wireless access point via the communication interface;

the logic is operable to acquire data representative of a time a signal is received by the first access point time stamped by the first clock, the time the signal is received by the second access point time stamped by the second clock, and a time the signal is received by the third access point time stamped by the third clock;

wherein the logic is operable to directly synchronize the time the signal was received relative to the second clock with the time the signal was received relative to the third clock based on clock synchronization data between the second and third clocks; and wherein the logic is operable to indirectly synchronize the time the signal was received relative to the first clock with the time the signal was received relative to the third clock by determining a difference between the clock synchronization data between the first and second clocks and the clock synchronization data between the second and third clocks.

7. The apparatus set forth in claim 6, wherein the logic is operable to determine a position of a transmitter of the signal based on a time difference of arrival of the time the signal was received relative to the first clock translated to the third clock, the time the signal was received by the second clock translated to the third clock and the time the signal was received relative to the third clock.

8. Logic encoded in a non-transitory, tangible computer readable medium for execution by a processor, and when executed operable to:

receive data from a plurality of clocked devices, wherein the data from the plurality of clocked devices comprises data representative of signal strengths measured by the plurality of clocked devices;

determine multiple common clocked devices that are common to two clocked devices selected from the plurality of clocked devices; and select a selected common clocked device from the multiple common clocked devices for indirectly synchronizing the two clocked devices based on which of the multiple common clocked devices has higher measured signal strengths with the two clocked devices.

9. The logic set forth in claim 8, wherein data from the plurality of clocked devices further comprises data representative of retries between the multiple common clocked devices and the two clocked devices; and the logic is further operable to select the selected common clocked device based on which of the multiple common clocked devices has higher measured signal strengths and lower number of retries with the two clocked devices.

10. The logic set forth in claim 9, wherein the data from the plurality of clocked devices further comprises clock synchronization data between a first clock associated with a first clocked device and a second clock associated with the selected common clocked device and via the interface;

wherein the clock synchronization data comprises data representative of clock offset and data representative of clock drift corresponding to a rate of change of the clock offset between the first and second clocks;

the logic is further operable to:

synchronize the first clock and the second clock at a future time based on the clock synchronization data;

receive clock synchronization data for a third clock associated with a third clocking device and the second clock via the interface;

indirectly synchronize the first clock and the third clock at the future time by translating the clock synchronization data between the first and second clocks and the clock synchronization data between the second and third clocks to a common time frame and determining a difference between translated data;

wherein the clock synchronization data between the first clock and second clock comprises data representative of a time a first signal was transmitted by the first clocked device based on the first clock and data representative of a time the first signal was received by the selected common clocked device clocked device based on the second clock;

wherein the clock synchronization data between the first clock and second clock further comprises data representative of a time a second signal was transmitted by the selected common clocked device clocked device based on the second clock and data representative of a time the second signal was received by the first clocked device based on the first clock; and wherein the logic is further operable to determine a clock offset based on a difference between the time the second signal was received by the first clocked device and the time the first signal was received by the selected common clocked device clocked device and a difference between the time the first signal was sent by first device and the time the second signal was sent by the selected common clocked device.

11. The logic set forth in claim 8, wherein the clock synchronization data between the second clock and third clock comprises a clock offset and a clock drift corresponding to a rate of change for the clock offset between the second and third clocks.

12. The logic set forth in claim 8, wherein the logic uses a first order approximation to compute the rate of change for the clock offset between the first and second clocks and the rate of change for the clock offset between the first and second clocks.

13. The logic set forth in claim 8, wherein the logic is further operable to:

acquire data representative of clock synchronization data between a first clock associated with a first wireless access point and a second clock associated with a second wireless access point, the selected common clocked device, and data representative of clock synchronization data between the second clock and a third clock associated with a third wireless access point via the communication interface;

acquire data representative of a time a signal is received by the first access point time stamped by the first clock, the time the signal is received by the second access point time stamped by the second clock, and a time the signal is received by the third access point time stamped by the third clock;

directly synchronize the time the signal was received relative to the second clock with the time the signal was received relative to the third clock based on clock synchronization data between the second and third clocks; and indirectly synchronize the time the signal was received relative to the first clock with the time the signal was received relative to the third clock by determining a difference between the clock synchronization data between the first and second clocks and the clock synchronization data between the second and third clock.

14. The logic set forth in claim 13, wherein the logic is operable to determine a position of a transmitter of the signal based on a time difference of arrival of the time the signal was received relative to the first clock translated to the third clock, the time the signal was received by the second clock translated to the third clock and the time the signal was received relative to the third clock.

15. A method, comprising:
receiving data from a plurality of clocked devices, wherein the data from the plurality of clocked devices comprises data representative of signal strengths measured by the plurality of clocked devices;
determining multiple common clocked devices that are common to two clocked devices selected from the plurality of clocked devices; and
selecting a selected common clocked device from the multiple common clocked devices for indirectly synchronizing the two clocked devices based on which of the multiple common clocked devices has higher measured signal strengths with the two clocked devices.

16. The method set forth in claim 15, wherein data from the plurality of clocked devices further comprises data representative of retries between the multiple common clocked devices and the two clocked devices; and
wherein selecting the selected common clocked device is based on which of the multiple common clocked devices has higher measured signal strengths and lower number of retries with the two clocked devices.

17. The method set forth in claim 16, wherein the data from the plurality of clocked devices further comprises clock synchronization data between a first clock associated with a first clocked device and a second clock associated with the selected common clocked device and via the interface;
wherein the clock synchronization data comprises data representative of clock offset and data representative of clock drift corresponding to a rate of change of the clock offset between the first and second clocks;
the method further comprising:
synchronizing the first clock and the second clock at a future time based on the clock synchronization data;
receiving clock synchronization data for a third clock associated with a third clocking device and the second clock via the interface;
indirectly synchronizing the first clock and the third clock at the future time by translating the clock synchronization data between the first and second clocks and the clock synchronization data between the second and third clocks to a common time frame and determining a difference between translated data;
wherein the clock synchronization data between the first clock and second clock comprises data representative of a time a first signal was transmitted by the first clocked device based on the first clock and data representative of a time the first signal was received by the selected common clocked device clocked device based on the second clock;
wherein the clock synchronization data between the first clock and second clock further comprises data representative of a time a second signal was transmitted by the selected common clocked device clocked device based on the second clock and data representative of a time the second signal was received by the first clocked device based on the first clock; and
determining a clock offset based on a difference between the time the second signal was received by the first clocked device and the time the first signal was received by the selected common clocked device clocked device and a difference between the time the first signal was sent by first device and the time the second signal was sent by the selected common clocked device.

18. The method set forth in claim 15, further comprising:
acquiring data representative of clock synchronization data between a first clock associated with a first wireless access point and a second clock associated with a second wireless access point, the selected common clocked device, and data representative of clock synchronization data between the second clock and a third clock associated with a third wireless access point via the communication interface;
acquiring data representative of a time a signal is received by the first access point time stamped by the first clock, the time the signal is received by the second access point time stamped by the second clock, and a time the signal is received by the third access point time stamped by the third clock;
directly synchronizing the time the signal was received relative to the second clock with the time the signal was received relative to the third clock based on clock synchronization data between the second and third clocks; and
indirectly synchronizing the time the signal was received relative to the first clock with the time the signal was received relative to the third clock by determining a difference between the clock synchronization data between the first and second clocks and the clock synchronization data between the second and third clocks.

19. The method set forth in claim 18, further comprising determining a position of a transmitter of the signal based on a time difference of arrival of the time the signal was received relative to the first clock translated to the third clock, the time the signal was received by the second clock translated to the third clock and the time the signal was received relative to the third clock.

20. Logic encoded in a non-transitory, tangible media for execution and when executed operable to:
acquire data representative of clock synchronization data between a first clock associated with a first clocked device and a second clock associated with a second clocked device and via the interface, wherein the clock synchronization data comprises data representative of clock offset and data representative of clock drift corresponding to a rate of change of the clock offset between the first and second clocks;
synchronize the first clock and second clock at a future time based on the clock synchronization data;
receive clock synchronization data for a third clock associated with a third clocking device and the second clock via the interface;
indirectly synchronize the first clock and the third clock at the future time by translating the clock synchronization data between the first and second clocks and the clock synchronization data between the second and third clocks to a common time frame and determining a difference between translated data, wherein the clock synchronization data between the first clock and second clock comprises data representative of a time a first signal was transmitted by the first clocked device based on the first clock and data representative of a time the first signal was received by the second clocked device based on the second clock, wherein the clock synchronization data between the first clock and second clock further comprises data representative of a time a second signal was transmitted by the second clocked device based on the second clock and data representative of a time the second signal was received by the first clocked device based on the first clock; and determine a clock offset based on a difference between the time the second signal was received by the first clocked device and the time the first signal was received by the second clocked device and a difference between the time the first signal was sent by first device and the time the second signal was sent by the second device.

21. A method, comprising:

acquiring data representative of clock synchronization data between a first clock associated with a first clocked device and a second clock associated with a second clocked device and via the interface, wherein the clock synchronization data comprises data representative of clock offset and data representative of clock drift corresponding to a rate of change of the clock offset between the first and second clocks;

synchronizing the first clock and second clock at a future time based on the clock synchronization data;

receiving clock synchronization data for a third clock associated with a third clocking device and the second clock via the interface;

indirectly synchronizing the first clock and the third clock at the future time by translating the clock synchronization data between the first and second clocks and the clock synchronization data between the second and third clocks to a common time frame and determining a difference between translated data, wherein the clock synchronization data between the first clock and second clock comprises data representative of a time a first signal was transmitted by the first clocked device based on the first clock and data representative of a time the first signal was received by the second clocked device based on the second clock, wherein the clock synchronization data between the first clock and second clock further comprises data representative of a time a second signal was transmitted by the second clocked device based on the second clock and data representative of a time the second signal was received by the first clocked device based on the first clock; and determining a clock offset based on a difference between the time the second signal was received by the first clocked device and the time the first signal was received by the second clocked device and a difference between the time the first signal was sent by first device and the time the second signal was sent by the second device.

* * * * *